Patented Nov. 22, 1932

1,888,886

UNITED STATES PATENT OFFICE

DAVID ARTHUR PRITCHARD, OF SANDWICH, ONTARIO, CANADA, ASSIGNOR TO THE PENNSYLVANIA SALT MANUFACTURING COMPANY, OF PHILADELPHIA, PENNSYLVANIA

TREATMENT OF CAUSTIC SOLUTIONS FOR THE PRODUCTION OF SOLUTIONS AND OF SOLID CAUSTIC SODA OF A HIGH DEGREE OF PURITY

No Drawing. Application filed July 17, 1928, Serial No. 293,489, and in Great Britain October 21, 1927.

The purity of solid caustic soda obtained for example by evaporation of dilute caustic liquor effluent from electrolytic cells operating on the porous diaphragm principle depends upon the successful removal of such salts as sodium chloride and sodium sulphate from these liquors. Such liquors usually contain up to 190 to 200 parts of sodium chloride and 12 to 14 parts of sodium sulphate for every 100 parts of $Na_2O$ present in solution.

During evaporation for the production of solid caustic soda these liquors become saturated with respect to sodium chloride and sodium sulphate, and as evaporation proceeds beyond this point, these impurities begin to crystallize out and may be separated. The extent to which these impurities may be removed depends both upon degree of concentration of the caustic soda solution and the temperature at which separation takes place. It is not advisable in practice to carry evaporation beyond a stage at which the total $Na_2O$ in solution amounts to 37 to 39 per cent by weight, owing to the danger of such solutions partially solidifying on cooling. By the time the above concentration has been reached, however, the solubility of sodium chloride in such liquors has been depressed to about 2.2 parts per 100 parts of $Na_2O$ and that of sodium sulphate to about 0.08 parts per 100 parts of $Na_2$. In other words about 99 per cent of both the sodium chloride and sulphate, originally present in cell liquor effluent has been precipitated from solution and can be separated.

For the production of caustic soda testing at least 76.5 per cent actual $Na_2O$, from evaporated cell liquor effluent, it is very desirable that the quantity of sodium chloride in such liquors should be depressed to below 0.7 parts per every 100 parts $Na_2O$ in solution.

The present invention has for its object to bring about a further removal of sodium chloride in order to satisfy or approach the above ratio by a special treatment of caustic soda liquors without further intentional evaporation.

The method of attaining this object according to the present invention consists in the treatment of evaporated caustic soda liquors, for example say of 36 to 39 per cent $Na_2O$ concentration (by weight) with a salt or salts of sulphuric acid or even sulphuric acid itself.

In each case the reaction depends upon the use of sodium sulphate. This salt may be introduced directly as the neutral sulphate, or its hydrates. Alternatively, sodium hydrogen sulphate may be added which by reaction with the caustic soda produces sodium sulphate. Certain metallic sulphates other than sodium may be introduced, which by reaction with the caustic soda will produce sodium sulphate and insoluble metallic hydroxides which metallic hydroxides can be separated off without serious contamination of the caustic soda. If sulphuric acid be used, which by combination with a portion of the caustic soda will produce the necessary sodium sulphate, care must be taken to use acid of such concentration, and in such a manner, as will not cause a too violent reaction, while at the same time avoiding as much as possible dilution of the caustic soda solution. These reagents, preferably but not necessarily in the anhydrous form, are mixed with the concentrated caustic soda solutions. The process of removal of the sodium chloride is further assisted by intimate contact between the added reagent and the caustic soda solution. Such treatment results in the formation of a precipitate comprising a salt containing the major portion of the sodium chloride originally present in the solution.

The quantity of reagent required for the most complete removal of sodium chloride is found to be dependent upon the quantity of sodium chloride present and when working with anhydrous sodium sulphate as reagent is approximately 3 to 4 parts by weight of sodium sulphate to every part of sodium chloride present. Such a ratio of sulphate to chloride is however not present in evaporated cell liquors and according to our invention is provided by the addition of the salt or salts of sulphuric acid or even sulphuric acid itself as aforesaid. Separation from the caustic soda liquor of the above mentioned precipitate results in the production of a liquor containing a diminished quantity of sodium chloride. By suitable manipulation, liquors containing as little as 0.2 parts of sodium chloride per 100 parts of $Na_2O$ in solution may be obtained. This liquor on evaporation is capable of producing solid caustic soda of a high degree of purity.

It will be understood that the process I have described is applicable for the purification of solutions of caustic soda from sodium chloride, however these solutions may be produced and is not confined to the electrolytic process.

The following examples will further illustrate how the said invention may be carried into practical effect but the invention is not limited to these examples.

Example 1

To 300 parts by weight of caustic soda solution containing 3.09 parts by weight of sodium chloride and 111.3 parts by weight of $Na_2O$ (i. e. having a ratio of 2.78 parts of sodium chloride to 100 parts of $Na_2O$) are added 10 parts by weight of pulverized anhydrous sodium sulphate. The mixture is boiled for 45 minutes and allowed to cool to room temperature and the solid product precipitated is removed by settling or filtration. The clarified liquor contains 0.64 parts sodium chloride to every 100 parts of $Na_2O$, and on evaporation yields solid caustic soda of a high degree of purity.

Example 2

To 300 parts by weight of caustic soda solution containing 3.94 parts by weight of sodium chloride and 112.8 parts by weight of $Na_2O$ (i. e. having a ratio of 3.49 parts of sodium chloride to every 100 parts of $Na_2O$) are added 12 parts by weight of pulverized anhydrous sodium sulphate, and the mixture is agitated at 20° centigrade for one hour. The precipitated solids containing sodium chloride are removed by settling or filtration. The clear liquor after filtration contains 0.289 parts of sodium chloride per 100 parts of $Na_2O$, and on evaporation yields solid caustic soda of a high degree of purity.

What I claim is:—

1. An improved process for the manufacture and production of caustic soda solutions and solid caustic soda therefrom of a high degree of purity comprising treating concentrated caustic soda liquors or solutions with sulphuric acid whereby the major portion of the sodium chloride originally present in the liquors or solutions is precipitated.

2. An improved process for the manufacture and production of caustic soda solutions and solid caustic soda therefrom of a high degree of purity comprising treating concentrated caustic soda liquors or solutions with sodium sulphate whereby the major portion of the sodium chloride present in the liquors or solutions is precipitated.

3. An improved process for the manufacture and production of caustic soda solutions and solid caustic soda therefrom of a high degree of purity comprising treating concentrated caustic soda liquors or solutions with sodium sulphate of amount sufficient to bring the ratio of the parts of sodium sulphate to sodium chloride in the solution to approximately 3 to 1 whereby the major portion of the sodium chloride present in the liquors or solutions is precipitated.

4. An improved process for the manufacture and production of caustic soda solutions and solid caustic soda therefrom of a high degree of purity comprising treating concentrated caustic soda liquors or solutions with anhydrous sodium sulphate whereby the major portion of the sodium chloride present in the liquors or solutions is precipitated.

5. An improved process for the manufacture and production of caustic soda solutions and solid caustic soda therefrom of a high degree of purity comprising treating concentrated caustic soda liquors or solutions with sulphuric acid of amount sufficient to bring the ratio of the parts of sodium sulphate to sodium chloride in the solution to approximately 3 to 1 whereby the major portion of the sodium chloride originally present in the liquors or solutions is precipitated.

6. An improved process for the manufacture and production of caustic soda solutions and solid caustic soda therefrom of a high degree of purity comprising treating concentrated caustic soda liquors or solutions with anhydrous sodium sulphate of amount sufficient to bring the ratio of the parts of sodium sulphate to sodium chloride in the solution to approximately 3 to 1 whereby the major portion of the sodium chloride present in the liquors or solutions is precipitated.

7. An improved process for the manufacture and production of caustic soda solutions and solid caustic soda therefrom of a high degree of purity comprising treating concentrated caustic soda liquors or solutions with a reagent which will increase the amount of sodium sulphate in the liquors or solutions to such an extent that the major portion of the sodium chloride originally present in the liquors or solutions is precipitated.

8. An improved process for the manufacture and production of caustic soda solutions and solid caustic soda therefrom of a high degree of purity comprising treating concentrated caustic soda liquors or solutions with a salt or salts of sulphuric acid which will increase the amount of sodium sulphate in the liquors or solutions to such an extent that the major portion of the sodium chloride originally present in the liquors or solutions is precipitated.

9. The process of purifying concentrated solutions of sodium hydroxide containing sodium chloride for removal of the latter, which comprises treating the solution with sodium sulphate to react therewith to form a salt substantially insoluble in the solution.

10. The process of purifying concentrated solutions of sodium hydroxide containing sodium chloride for removal of the latter, which comprises treating the solution with anhydrous sodium sulphate to react therewith to form a salt substantially insoluble in the solution.

In testimony whereof I have signed my name to this specification.

DAVID ARTHUR PRITCHARD.